(12) United States Patent
Tokoi et al.

(10) Patent No.: US 8,247,129 B2
(45) Date of Patent: Aug. 21, 2012

(54) SOLID OXIDE FUEL CELL FOR A POWER GENERATION

(75) Inventors: Hiromi Tokoi, Tokai (JP); Nariyoshi Kobayashi, Hitachinaka (JP); Shin Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1230 days.

(21) Appl. No.: 11/205,200

(22) Filed: Aug. 17, 2005

(65) Prior Publication Data

US 2006/0040153 A1    Feb. 23, 2006

(30) Foreign Application Priority Data

Aug. 19, 2004   (JP) ................................. 2004-239100

(51) Int. Cl.
*H01M 8/24* (2006.01)
*H01M 4/02* (2006.01)

(52) U.S. Cl. ........ 429/465; 429/466; 429/495; 429/484; 429/523

(58) Field of Classification Search .................... 429/31, 429/30, 40, 43, 34, 20, 465, 466, 495, 484, 429/523, 528, 482, 491
See application file for complete search history.

(56) References Cited

U.S. PATENT DOCUMENTS

| | | | |
|---|---|---|---|
| 2002/0177031 A1* | 11/2002 | Doshi et al. | 429/44 |
| 2003/0124412 A1* | 7/2003 | Barnett et al. | 429/40 |
| 2004/0058230 A1 | 3/2004 | Hsu | |
| 2004/0121222 A1* | 6/2004 | Sarkar et al. | 429/45 |
| 2004/0131912 A1 | 7/2004 | Keefer | |
| 2006/0040153 A1* | 2/2006 | Tokoi et al. | 429/20 |

FOREIGN PATENT DOCUMENTS

| | | |
|---|---|---|
| DE | 195 19 847 | 1/1997 |
| DE | 691 21 735 | 2/1997 |
| JP | 58-64771 | 4/1983 |
| JP | 2-186565 | 7/1990 |
| JP | 3-238763 | 10/1991 |
| JP | 4-274168 | 9/1992 |
| JP | 8-138697 | 5/1996 |
| JP | 2001-196084 | 7/2001 |

OTHER PUBLICATIONS

Official Action issued in Japanese Patent Application No. 2004-239100 on Aug. 31, 2010.

* cited by examiner

*Primary Examiner* — Raymond Alejandro
(74) *Attorney, Agent, or Firm* — Antonelli, Terry, Stout & Kraus, LLP.

(57) ABSTRACT

A fuel cell provided with a reforming catalyst is located in a high-temperature portion on the anode side to cool the high-temperature portion by means of heat absorption of reforming reaction, or a combustion catalyst is provided in a low-temperature portion on the anode side to heat the low-temperature portion by means of heat generation of combustion reaction, or both of the catalysts are provided, by which the occurrence of variations in temperature in a cell reaction region of anode is prevented.

17 Claims, 6 Drawing Sheets

SOLID OXIDE FUEL CELL FOR A POWER GENERATION

INCORPORATION BY REFERENCE

The present application claims priority from Japanese application JP2004-239100 filed on Aug. 19, 2004, the content of which is hereby incorporated by reference into this application.

BACKGROUND OF THE INVENTION

The present invention relates to a fuel cell and, more particularly, to a solid oxide fuel cell.

A fuel cell is a power generating device which is provided with an anode (fuel electrode) on one side and a cathode (air electrode) on the other side with an electrolyte being held therebetween, and generates power by allowing a fuel gas supplied to the anode side to react electrochemically with an oxidizer gas supplied to the cathode side via the electrolyte. A solid oxide fuel cell, which is one kind of fuel cells, not only has high power generating efficiency but also is operated at a high temperature of 600 to 1000° C., so that it can carry out a fuel reforming reaction in the cell without the use of a noble metal catalyst, and can use a variety of fuels. Also, since the cell system construction is simple, the solid oxide fuel cell has a potential for reducing the cost as compared with other types of fuel cells. Naturally, the exhaust heat is easily used because of its high temperature, and hence the solid oxide fuel cell has a characteristic of being easily used to form not only a cogeneration system but also a hybrid system with a gas turbine and other equipment.

The high cell working temperature of 600 to 1000° C. offers the above-described advantages, but on the other hand, has a disadvantage that it is very difficult to maintain the temperature in the cell uniformly. If the variations in temperature distribution in a cell reaction region are large, the electrical resistance of a low-temperature portion becomes higher than that of a high-temperature portion, and hence the cell current is turned down. On the other hand, in the high-temperature portion, the electrical resistance is low, and the current concentrates therein. Therefore, unevenness of cell current occurs, and the whole of the cell reaction region cannot be utilized uniformly, which corresponds to a decreased effective cell reaction area, so that the cell performance such as output and efficiency decreases. Also, there arises a problem in that the cell is damaged by a thermal stress generated by a difference in temperature or the corrosion and degradation of material proceed in the high-temperature portion.

A fuel cell has been known in which in order to reduce the variations in temperature distribution in the cell, in a fuel cell having a tube shaped solid electrolyte, an oxidizer gas is supplied from not only a location near the bottom of tube but also a plurality of locations in the axial direction of the solid electrolyte to increase the reactivity (for example, refer to JP-A-3-238763 (claims)).

In the above-described prior art, the uniformity of temperature is achieved by decreasing an oxygen concentration gradient in an inside space of tube.

It is an object of the present invention to provide a fuel cell in which a high-temperature portion in a cell reaction region is cooled or a low-temperature portion therein is heated by a method different from that in the prior art, by which the uniformity of temperature distribution in the cell reaction region is achieved.

SUMMARY OF THE INVENTION

In the present invention, a region in which the concentration of a reforming catalyst for reforming a fuel is increased is provided in a high-temperature portion in a cell reaction region of an anode to cool the high-temperature portion in the cell reaction region by utilizing a cooling function due to an endothermic reaction of reforming catalyst. Also, a region in which the concentration of a combustion catalyst for burning the fuel is increased is provided in a low-temperature region in the cell reaction region of the anode to heat the low-temperature region in the cell reaction region by utilizing a heating function due to an exothermic reaction of combustion catalyst.

The configuration may be such that the reforming catalyst is provided in the high-temperature portion in the cell reaction region of anode and further the combustion catalyst is provided in the low-temperature portion thereof. Also, by branchingly spraying an air flow from an air introduction tube of cathode so that a cooling effect is produced in the high-temperature portion, the temperature distribution can further be uniformed.

According to the present invention, the high-temperature portion in the cell reaction region of anode is cooled by the endothermic reaction of reforming catalyst, or the low-temperature portion in the cell reaction region of anode is heated by the exothermic reaction of combustion catalyst, so that the temperature distribution can be made uniform as the whole of the cell reaction region. As a result, effects of increased cell output, prevention of deterioration or corrosion of cell material, and the like can be achieved.

Other objects, features and advantages of the invention will become apparent from the following description of the embodiments of the invention taken in conjunction with the accompanying drawings.

EXPLANATION OF REFERENCE NUMERALS

1 . . . Solid electrolyte, 2 . . . Anode, 3 . . . Cathode, 4 . . . Air introduction tube, 5 . . . Cell case, 6 . . . Fuel, 7 . . . Air, 8 . . . Exhaust gas, 9 . . . Reforming catalyst, 10 . . . Air spray port, 11 . . . Combustion catalyst, 12 . . . Electrode, 13 . . . Air header

DETAILED DESCRIPTION OF THE INVENTION

Solid oxide fuel cells are broadly divided into a tube type and a flat plate type according to the shape of solid electrolyte. For the tube type, a central position in the axial direction of the electrolyte is prone to have the highest temperature and both ends are prone to have the lowest temperature. For the flat plate type as well, a difference in temperature is caused between an end portion and a central portion of flat plate depending on the direction of gas flow. Hereunder, detailed explanation will be given taking a tube type fuel cell by way of example.

Figure 2:
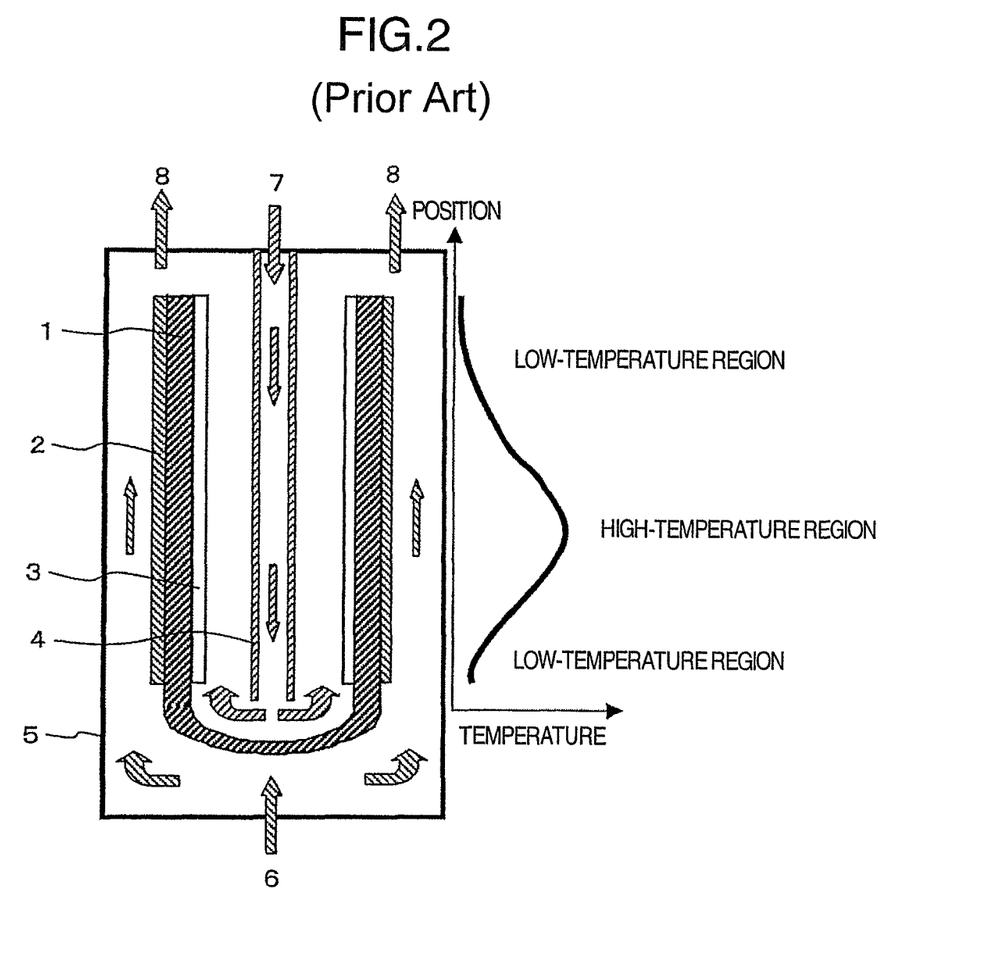
FIG. 2 is a sectional view showing a conventional example of a fuel cell of this type.

As an example of a tube type fuel cell, a unit cell provided with an anode 2 on the outer surface of a tube shaped solid electrolyte 1 and a cathode 3 on the inner surface thereof as shown in FIG. 2 is considered. In an inside space of the tube shaped solid electrolyte provided in a cell case 5, an air introduction tube 4, which is a tube for introducing an oxidizer gas, is inserted to spray air 7 from a location near the bottom of the tube as indicated by arrows. The oxygen in the blown-in air turns into oxygen ions on the cathode 3, and the oxygen ions pass through the solid electrolyte 1 and arrive at the anode 2. To the anode 2, a fuel 6 of a hydrocarbon fuel such as hydrogen, carbon monoxide, methane, propane, or city gas, a liquid fuel, or the like fuel is supplied. The oxygen ions arriving at the anode 2 react with the fuel 6. As a result, a current flows between the anode 2 and the cathode 3. Exhaust gas 8 having been used for cell reaction is discharged to the outside of the cell case 5.

As additionally shown in FIG. 2, the temperature distribution of the anode 2 in a cell reaction region exhibits the highest temperature in a location near a central portion in the axial direction of the solid electrolyte 1. At the time of cell operation, it is necessary to maintain the cell reaction region of the anode 2 at a high temperature of 600 to 1000° C. However, in a lower portion in the axial direction of the tube shaped solid electrolyte 1, both of the supplied fuel 6 and air 7 have a temperature lower than a cell working temperature, and heat radiation in an end portion is great, so that the temperature is lower than that in the central portion in the axial direction of the solid electrolyte 1 though heat is generated by the power generating reaction of cell. In the central portion in the axial direction of the solid electrolyte 1, the temperature of the fuel 6 is raised by the cell reaction in a lower portion, and the air 7 is also heated in the lower portion in the axial direction of the solid electrolyte 1 so that the temperature thereof is raised to provide a high temperature. On the other hand, in an upper portion in the axial direction of the solid electrolyte 1, the concentration of the fuel 6 is low, thereby decreasing the cell reaction density, and the heat radiation in the end portion is great, so that the temperature is liable to become low as compared with the central portion in the axial direction. As a result, a difference in temperature in the axial direction of the unit cell generally reaches 100 to 200° C.

Furthermore, for the temperature distribution in a bundle (assembled cell), in which unit cells are connected electrically in series or in parallel, as well, great unevenness occurs similarly between the central portion and the end portion of the bundle.

By contrast, according to the present invention, as is apparent from the examples described below, the occurrence of temperature unevenness in the cell reaction region of the anode can be restrained, and hence uniform temperature distribution can be obtained.

Description of Preferred Embodiment

EXAMPLE 1

Figure 1:
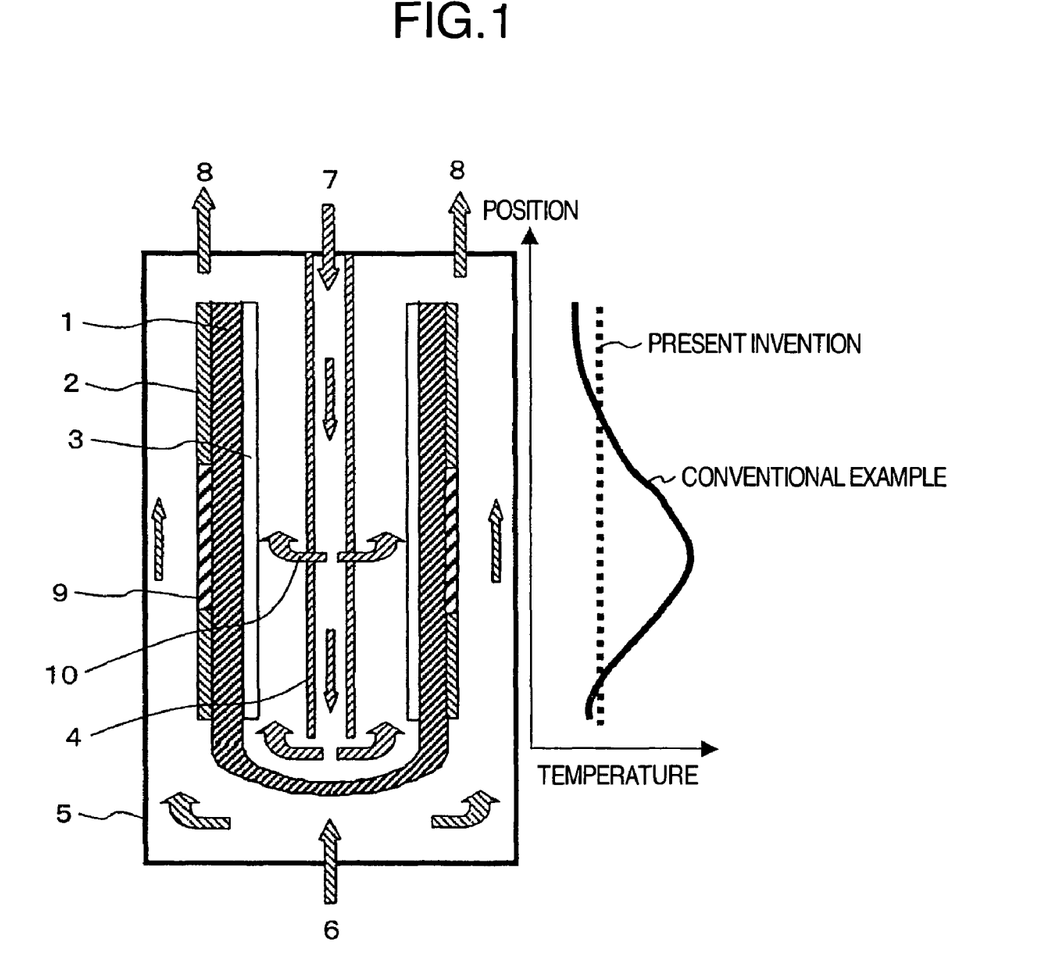
FIG. 1 is a sectional view of a solid oxide fuel cell in accordance with one example of the present invention.

FIG. 1 shows an example in which the present invention is applied to a fuel cell having a tube type solid electrolyte. The fuel cell of this example is provided with the cathode 3 on the inner surface of the tube shaped solid electrolyte 1 and the anode 2 on the outer surface thereof, and is also provided with a reforming catalyst 9 in a high-temperature portion of the cell reaction region of the anode 2. Also, the air introduction tube 4 is provided in the inside space of the tube consisting of the solid electrolyte 1. The air introduction tube 4 is configured so that air is sprayed from two locations: the bottom portion of the tube and a location near the central portion in the axial direction of the electrolyte. As the solid electrolyte, yttrium-stabilized zirconia (YSZ) was used. As the anode 2, porous cermet consisting of nickel and YSZ was used, and as the cathode 3, lanthanum manganite was used. Also, as the reforming catalyst 9, a nickel-lanthanum based catalyst, which has generally been used as the catalyst of this type, was used, but other reforming catalysts such as a ruthenium-based catalyst can also be used. The nickel-lanthanum based catalyst was formed by sintering after being applied to the anode 2.

Hereunder, to explain the cell temperature, a reaction formula for reforming reaction using the reforming catalyst and a reaction formula for power generating reaction (cell reaction) are shown. First, a method for generating a reforming gas containing hydrogen by reforming a hydrocarbon fuel is explained by taking methane as the hydrocarbon fuel by way of example. On the reforming catalyst, methane reacts with water vapor (reforming reaction) mainly by the reaction expressed by Formula (1) to yield hydrogen. As the water vapor used for the reforming reaction, water vapor supplied into the cell case 5 together with the fuel 6 or water vapor recovered from the exhaust gas 8 is used.

$$CH_4 + H_2O \rightarrow CO + 3H_2 \tag{1}$$

CO yielded by this reforming reaction is further converted into hydrogen by the reaction with $H_2O$ (CO conversion reaction) expressed by the following formula (2).

$$CO + H_2O \rightarrow CO_2 + H_2 \tag{2}$$

The reaction for yielding hydrogen from the hydrocarbon fuel is an endothermic reaction. Therefore, in order to continue this reaction, it is necessary to supply heat. Generally, the reforming catalyst must be kept at a high temperature of about 400 to 800° C. To provide this high temperature, for example, the fuel 6 is supplied into the cell case 5 in a state of being heated to a high temperature in advance.

The cell reaction (power generating reaction) on the anode 2 is expressed by the following formulas (3) and (4), and is an exothermic reaction.

$$H_2 + \tfrac{1}{2}O_2 \rightarrow H_2O \tag{3}$$

$$CO + \tfrac{1}{2}O_2 \rightarrow CO_2 \tag{4}$$

In the case where the reforming catalyst 9 is not provided on the anode 2, the temperature distribution in the axial direction of the solid electrolyte 1 is such that the central portion thereof has a high temperature. In the case where the reforming catalyst 9 is provided, the endothermic reaction expressed by Formulas (1) and (2) takes place in this portion, so that the temperature distribution in the axial direction of the solid electrolyte 1 is uniformed, and hence a nearly flat temperature distribution is provided.

Furthermore, since in this example, an air spray port of the air introduction tube 7 is provided not only in the location near the bottom of the tube consisting of the solid electrolyte 1 but also in the central portion in the axial direction, which corresponds to the high-temperature portion, an effect of cooling the high-temperature portion in the central portion by the introduced air having a lower temperature is further enhanced. Therefore, the temperature distribution in the axial direction of the solid electrolyte 1 takes a shape extremely close to a flat shape as shown in FIG. 1. The result of actual measurement of temperature difference in the axial direction of the electrolyte for the unit cell of this example revealed that a difference in temperature between the highest temperature and the lowest temperature was decreased to within approximately 70° C.

In this example, since fuel is reformed mainly by the reforming catalyst provided in the central portion in the axial direction of the solid electrolyte, the concentration of hydrogen that is easily used as the fuel for fuel cell can be increased toward the upper portion in the axial direction. This produces an effect of activating the cell reaction on the downstream side on which the fuel concentration is liable to decrease extremely, namely, in the upper portion of the tube shaped solid electrolyte 1. Needless to say, since the cell reaction is an exothermic reaction, an effect of increasing the temperature of that portion is also produced.

In the above-described example, a description has been given of the fuel cell in which the cathode is provided on the inside of the tube consisting of the solid electrolyte and the anode is provided on the outside thereof. However, the present invention can be applied to a fuel cell in which the positions of the cathode and the anode are replaced with each other. Also, the reforming catalyst may be provided through the whole of the cell reaction region of anode to increase the concentration of reforming catalyst in the high-temperature portion. Also, the configuration may be such that the reforming catalyst is provided in the high-temperature portion in the cell reaction region of anode and a combustion catalyst is provided in the low-temperature portion.

EXAMPLE 2

Figure 3:
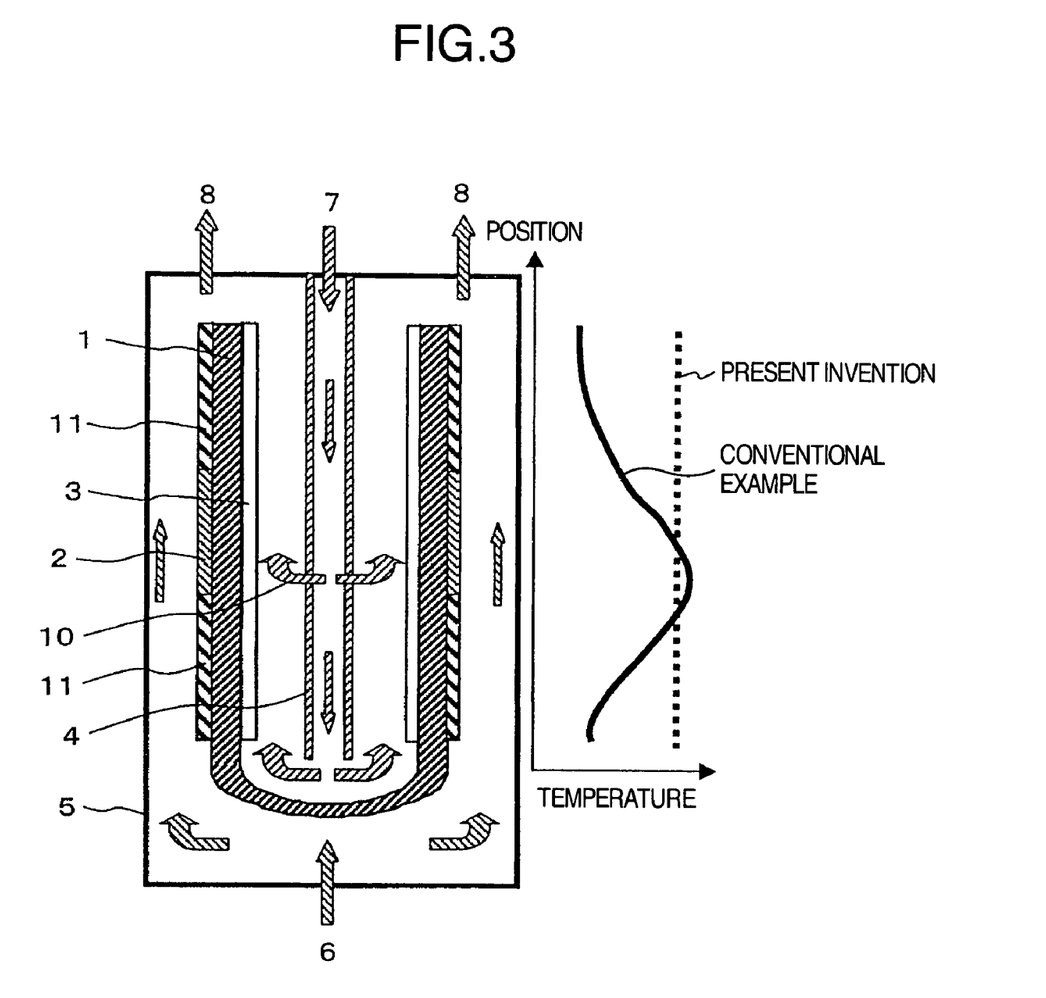
FIG. 3 is a sectional view showing another example of the present invention.

FIG. 3 shows another example of the present invention. In this example, after a combustion catalyst 11 was applied to the low-temperature portions of unit cell, namely, to the anode 2 corresponding to upper and lower positions in the axial direction of the tube shaped solid electrolyte 1, sintering was performed. As the combustion catalyst 11, a palladium-based catalyst can be used.

The combustion reaction of the combustion catalyst 11 is an exothermic reaction expressed by the following formula (5).

$$CH_4 + 2O_2 \rightarrow CO_2 + 2H_2O \quad (5)$$

For the unit cell of this example, the combustion catalyst 11 provided in the low-temperature portion of the anode 2 is heated, and thereby the temperatures in the upper and lower portions in the axial direction of the solid electrolyte 1 is increased. Therefore, the temperature distribution in the cell reaction region of anode can be made uniform as a whole in the axial direction of the electrolyte.

It is a matter of course that the measures of this example can be applied to the fuel cell in which the anode is provided on the inside of the solid electrolyte and the cathode is provided on the outside thereof.

EXAMPLE 3

Figure 4:
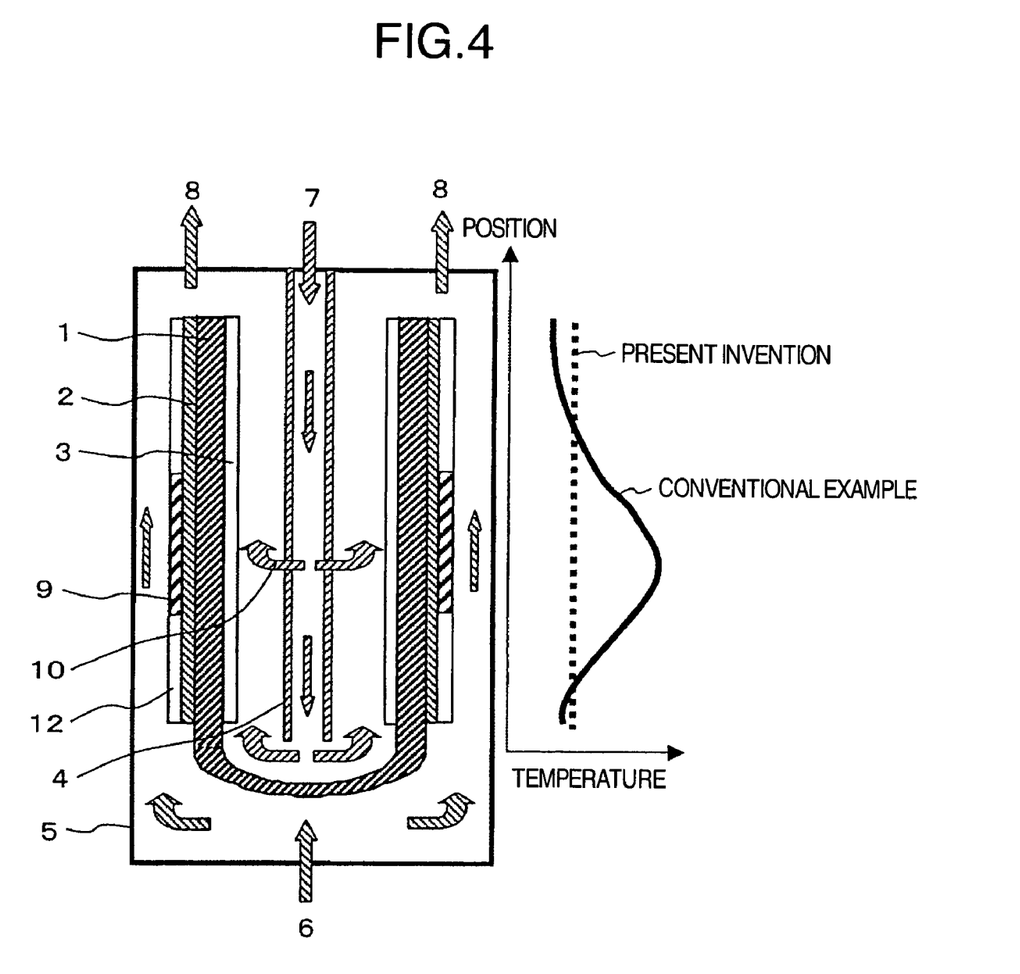
FIG. 4 is a sectional view showing still another example of the present invention.

FIG. 4 shows a still another example that is a modification of Example 1. In Example 1 shown FIG. 1, after the reforming catalyst 9 was applied to the anode 2 itself, sintering was performed. In Example 3 shown in FIG. 4, however, the reforming catalyst 9 was plasma sprayed on an electrode 12 provided at the outer periphery of the anode 2 to take out a current of the anode 2. The position at which the reforming catalyst 9 is provided is the same as that in Example 1, namely, a position corresponding to the central portion in the axial direction of the solid electrolyte 1. The function of the reforming catalyst is the same as that of the reforming catalyst shown in FIG. 1.

Figure 5:
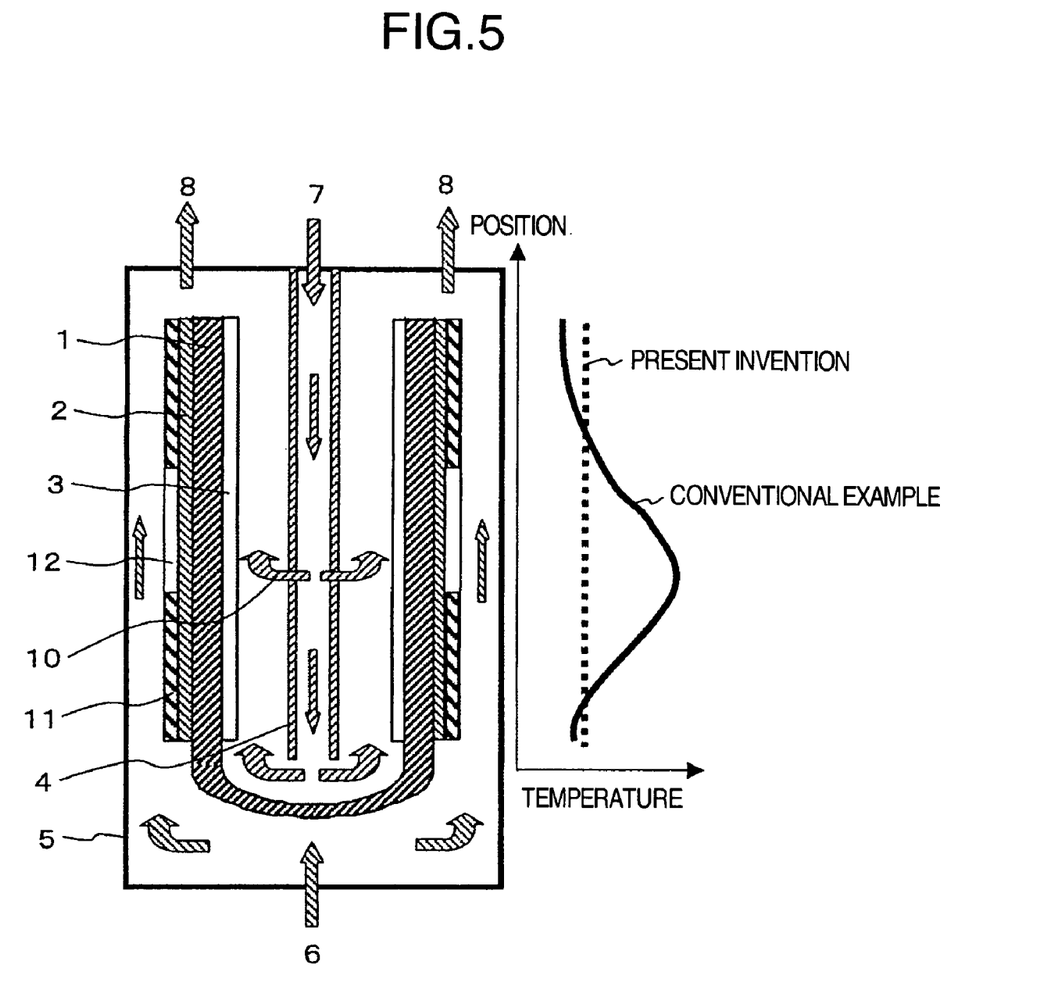
FIG. 5 is a sectional view showing a modification of the present invention.

FIG. 5 shows a modification of Example 2. In Example 2 shown in FIG. 3, the combustion catalyst 11 was provided on the anode 2 itself. In this modification shown in FIG. 5, however, the combustion catalyst 11 was plasma sprayed on the electrode 12 provided at the outer periphery of the anode 2. The position at which the combustion catalyst 11 is provided is the same as that in Example 2, namely, positions corresponding to the upper and lower portions in the axial direction of the solid electrolyte 1. The function of the reforming catalyst is the same as that of the reforming catalyst shown in FIG. 3.

In these modifications as well, variations in temperature distribution in the cell reaction region of anode can be restrained as in the case of Examples 1 and 2.

EXAMPLE 4

Figure 6:
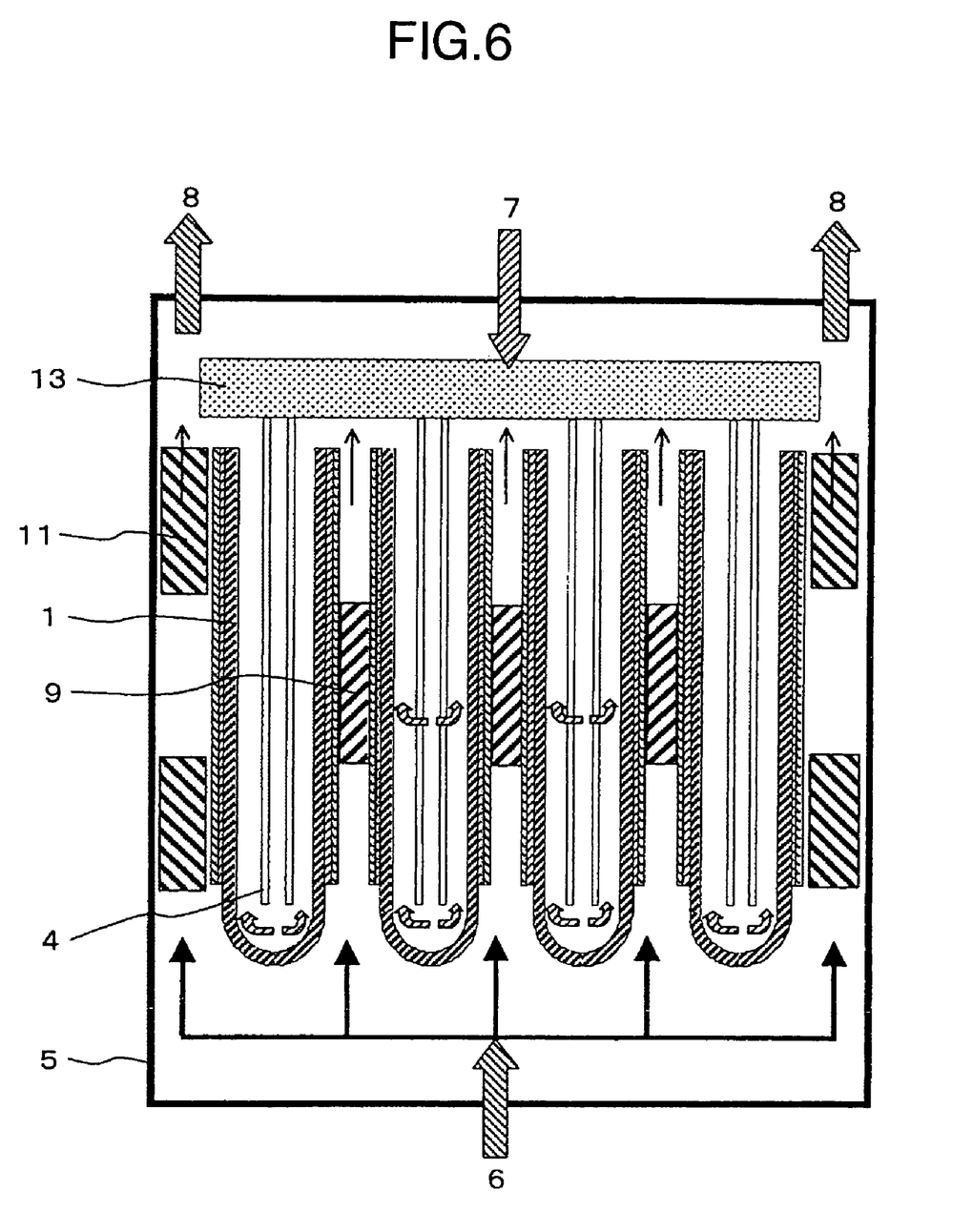
FIG. 6 is a sectional view showing an example of an assembled type fuel cell.

In Example 4, an assembled type fuel cell composed of a plurality of unit cells is explained with reference to FIG. 6. In the assembled type fuel cell, the cell in the central portion of bundle has a higher cell temperature than that of the cell in an end portion because of its better heat insulating condition. On the other hand, the cell temperature in the outer peripheral portion of bundle is lower than that in the central portion thereof because of heat radiation. Therefore, on the anode of the cell in the bundle central portion, the reforming catalyst 9 was applied at the central position in the axial direction of the solid electrolyte 1 to absorb heat. On the other hand, in the outer peripheral portion of bundle in which the temperature is low, the combustion catalyst 11 was applied to the electrode in the upper and lower portions in the axial direction of the solid electrolyte 1 to generate heat, by which the temperature was raised.

Further, of the air introduction tubes for supplying air to the cathodes of cells through an air header 13, the air introduction tubes inserted in the cells in the bundle central portion are each provided with the air spray port not only in the tip end portion but also in the central portion in the axial direction of the solid electrolyte to provide proper air flow distribution. Thereby, the temperature distribution of the bundle consisting of a plurality of cells could be uniformed.

In all of the above-described examples, a description has been given of the tube type fuel cell. However, it is a matter of course that the present invention can be applied to the flat plate type fuel cell. Also, the method for applying the catalyst to the anode or the electrode is not limited to sintering, plasma spraying, and the like, and any method can be applied.

According to the present invention, the temperature of the anode cell reaction region of the solid oxide fuel cell is uniformed, so that an effective cell reaction area can be increased. Thereby, there can be achieved effects of increased cell performance and prevention of damage to cell due to thermal stress generated by a temperature difference, and thus the industrial applicability is very high.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A solid oxide fuel cell comprising a tube-shaped solid electrolyte, an anode on one side of the solid electrolyte, and a cathode on another side of the solid electrolyte,
   wherein the anode is provided with a reforming catalyst in a central portion or a combustion catalyst in a lower portion and in an upper portion, the reforming catalyst is made of a material that is different from a material from which the combustion catalyst is made of, and wherein the material from which the combustion catalyst is made of in the upper and the lower portion of the anode does not show any combustion catalytic activity in the central portion of the anode and the material from which the reform catalyst is made of does not show any reforming catalytic activity in the lower and the upper portions of the anode, and a concentration of the reforming catalyst is higher in the central portion of the anode than in the upper and the lower portion of the anode in the axial direction of the solid electrolyte, or a concentration of the combustion catalyst is higher in the upper and the lower portion than in the central portion of the anode in the axial direction of the solid electrolyte.

2. The fuel cell according to claim 1, wherein the cathode is provided on the inner surface side of the electrolyte and the anode is provided on the outer surface side thereof; an oxidizer gas introduction tube for supplying an oxidizer gas is provided in an inside space of the tube shaped electrolyte that has a tube shaped portion; and an oxidizer gas spray port in the oxidizer gas introduction tube is provided in a location near the bottom of the tube shaped portion of the electrolyte and in the central portion in the axial direction of the electrolyte.

3. The fuel cell according to claim 1, wherein the cathode is provided on the inner surface side of the electrolyte and the anode is provided on the outer surface side thereof; an oxidizer gas introduction tube for supplying an oxidizer gas is provided in an inside space of the tube shaped electrolyte that has a tube shaped portion; and an oxidizer gas spray port in the oxidizer gas introduction tube is provided in a location near the bottom of the tube shaped portion of the electrolyte and in the central portion in the axial direction of the electrolyte.

4. The fuel cell according to claim 1, wherein the reforming catalyst is nickel-lanthanum based catalyst or a ruthenium-based catalyst.

5. The fuel cell according to claim 1, wherein the combustion catalyst is a palladium-based catalyst.

6. The fuel cell according to claim 1, wherein the anode is provided with the reforming catalyst.

7. The fuel cell according to claim 1, wherein the reforming catalyst reaction is an endothermic reaction and the combustion catalyst reaction is an exothermic reaction.

8. A solid oxide fuel cell comprising a tube-shaped solid electrolyte, a cathode on an inner-side of the solid electrolyte, and an anode and an electrode for taking out a current from the anode on an outer side of the solid electrolyte,
wherein the electrode is provided with a reforming catalyst in a central portion or a combustion catalyst in an upper and a lower portion, the reforming catalyst is made of a material that is different from a material from which the combustion catalyst is made of, and
wherein the material from which the combustion catalyst is made of in the upper and the lower portion of the electrode does not show any combustion catalytic activity in the central portion of the electrode and the material from which the reform catalyst is made of does not show any reform catalytic activity in the lower and the upper portions of the electrode and a concentration of the reforming catalyst is higher in the central portion of the electrode than in the upper and the lower portion of the electrode in the axial direction of the solid electrolyte, or a concentration of the combustion catalyst is higher in the upper and the lower portion of the electrode than in the central portion of the electrode in the axial direction of the solid electrolyte.

9. The fuel cell according to claim 8, wherein the cathode is provided on the inner surface side of the electrolyte and the anode is provided on the outer surface side thereof; an oxidizer gas introduction tube for supplying an oxidizer gas is provided in an inside space of the tube shaped electrolyte that has a tube shaped portion; and an oxidizer gas spray port in the oxidizer gas introduction tube is provided in a location near the bottom of the tube shaped portion of the electrolyte and in the central portion in the axial direction of the electrolyte.

10. The fuel cell according to claim 8, wherein the cathode is provided on the inner surface side of the electrolyte and the anode is provided on the outer surface side thereof; an oxidizer gas introduction tube for supplying an oxidizer gas is provided in an inside space of the tube shaped electrolyte that has a tube shaped portion; and an oxidizer gas spray port in the oxidizer gas introduction tube is provided in a location near the bottom of the tube shaped portion of the electrolyte and in the central portion in the axial direction of the electrolyte.

11. The fuel cell according to claim 8, wherein the electrode is provided with the combustion catalyst.

12. The fuel cell according to claim 8, wherein the reforming catalyst reaction is an endothermic reaction and the combustion catalyst reaction is an exothermic reaction.

13. An assembled solid oxide fuel cell comprising a plurality of unit cells, wherein each unit cell comprises a cathode on an inner side of a solid electrolyte which is tube shaped, an anode and an electrode for taking out a current from the anode on an outer side of the solid electrolyte, with the electrolyte being held therebetween,
wherein the anode of each unit cell is provided with a reforming catalyst in a central portion the reforming catalyst is made of a material that is different from a material located in an upper and a lower portion of the anode, and
wherein in one or the plurality of the unit cells, located in a center of the plurality of the unit cells, the material in the upper and the lower portion of the anode does not show any reforming catalytic activity in the central portion of the anode, and a concentration of the reforming catalyst is higher in the central portion of the anode than in the upper and the lower portion of the anode in the axial direction of the solid electrolyte.

14. The assembled fuel cell according to claim 13, wherein the fuel cell has a construction such that the unit cell is provided with the anode on one side of a tube shaped solid electrolyte and the cathode on the other side thereof.

15. The assembled fuel cell according to claim 14, wherein an oxidizer gas introduction tube for supplying an oxidizer gas is provided in an inside space of the tube shaped electrolyte that has a tube shaped portion, and the oxidizer gas introduction tube provided in one or a plurality of unit cells located in the center of the plurality of unit cells has an oxidizer gas spray port provided in a location near the bottom of the tube shaped portion of the electrolyte and in a central portion in the axial direction of the electrolyte.

16. The assembled fuel cell according to claim 15, wherein, of the plurality of unit cells, one or a plurality of unit cells located at the outer periphery of the plurality of the unit cells are provided with the oxidizer gas spray port in the oxidizer gas introduction tube in a location near the bottom of the tube of the electrolyte.

17. The assembled fuel cell according to claim 13, wherein the reforming catalyst reaction is an endothermic reaction.

* * * * *